Jan. 10, 1933.   J. J. LESIKAR   1,894,182
COTTON CLEANING DEVICE FOR COTTON GINS
Filed July 6, 1931   4 Sheets-Sheet 1

Inventor
John J. Lesikar

By Clarence A. O'Brien
Attorney

Jan. 10, 1933.  J. J. LESIKAR  1,894,182
COTTON CLEANING DEVICE FOR COTTON GINS
Filed July 6, 1931  4 Sheets-Sheet 2

Inventor

John J. Lesikar

By Clarence A. O'Brien
Attorney

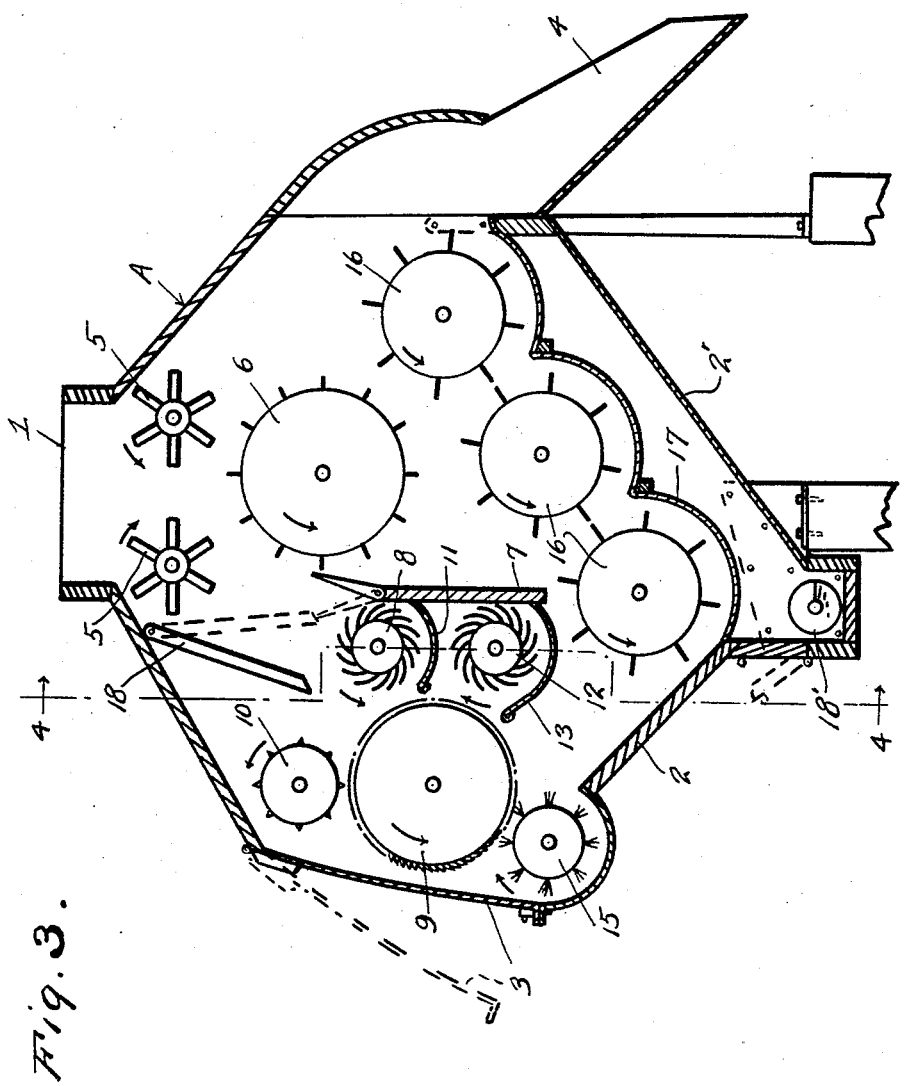

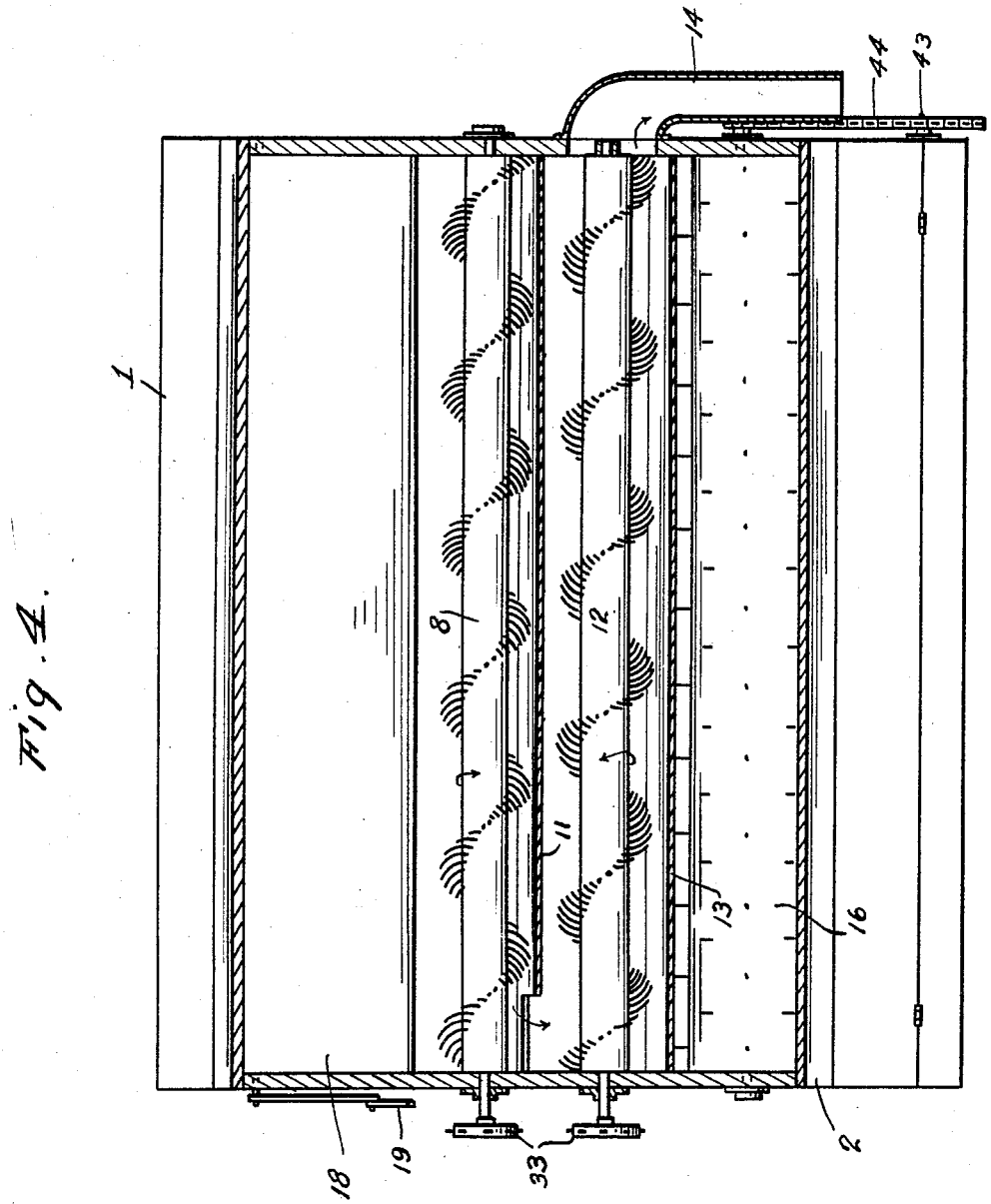

Patented Jan. 10, 1933

1,894,182

UNITED STATES PATENT OFFICE

JOHN J. LESIKAR, OF TEMPLE, TEXAS

COTTON CLEANING DEVICE FOR COTTON GINS

Application filed July 6, 1931. Serial No. 549,056.

This invention relates to a cotton cleaning device for use on cotton gins, the general object of the invention being to provide means for feeding cotton to a picker roller, which in turn feeds the cotton to spiral picker rollers which causes the cotton to be engaged by a saw for stripping the cotton from the burrs, with means for causing the burrs and other foreign matter to be thrown back upon the spirals the material being moved by the spirals first in one direction and then in an opposite direction, so that all the cotton will be removed from the burrs and foreign matter.

A further object of the invention is to provide a plurality of cleaning drums operating over screens to clean the cotton after the cotton leaves the saw device.

A further object of the invention is to provide means whereby clean cotton can be fed directly from the main picker roller to the cleaning drum without passing through the saw device and the spiral pickers when desired.

This invention also consists in certain other features of construction and in the combination and arrangement of the several parts to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Fig. 3 is a vertical sectional view.

Fig. 4 is a section on line 4—4 of Fig. 3.

Figure 1:
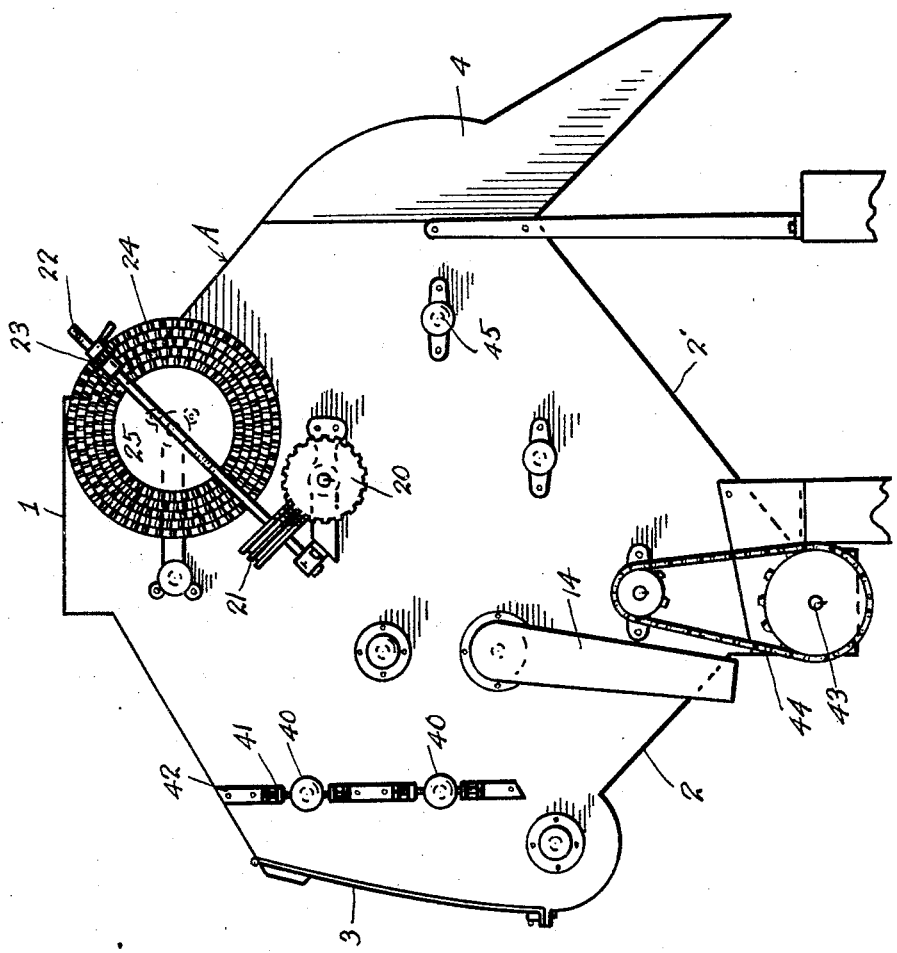
Figure 1 is a side view of the invention.

In these views, the letter A indicates the casing of the device which is provided with the inlet part 1 in its top with the side walls sloping outwardly and downwardly from said top and then the walls at the lower part of the casing slope downwardly and inwardly as shown at 2 and 2'. A door 3 is located in one side of the casing for permitting access into the interior of the casing, and a discharge chute 4 extends downwardly and outwardly from the opposite side of the casing. A pair of feeding rollers 5 are located in the top of the casing for receiving the material passing through the inlet 1 and a large picker roller or drum 6 is located under these feeding rollers. This roller 6 throws the cotton through a space located above a casing 7, in the partition, onto the upper roll of a pair of spiral rolls located near the opposite side of the partition from that on which the roller 6 is located, and this roller 8 is located slightly adjacent the top of the partition. This roll 8 throws the cotton against the saw device 9 and a stripper roller 10 throws the burrs and foreign matter from the cotton passing around the saw device, back upon the spiral roller 8, so that the material is again brought against the saw device.

A shield 11 is located under the roll 8 and the spiral nature of the roll 8 causes the material to be fed longitudinally, so that it will be brought into contact with the saw device for an appreciable time, preferably about two-thirds of the length of the machine. This material then drops from the shield 11 onto a second spiral roll 12 located under the shield 11 and which is also provided with a shield 13. This second spiral rolls causes the material to move in an opposite direction from that imparted to it by the first roll 8 so that the material is again brought into contact with the saw and thus all the cotton is removed from the burrs. The material is finally caused by the second spiral roll 12 to pass into a discharge chute 14.

The cotton is cleaned from the saw device by the brush roller 15 and the cotton from the brush roller slides down the incline 2 where it is engaged by the picker drums 16, the drawings showing three of such drums arranged in a diagonal row, and each drum located above a screen 17 so that the foreign matter separated from the cotton by these drums will pass through the screen and fall upon the incline 2' and thus pass to the discharge conveyor 18 at the bottom of the casing.

The clean cotton will be deposited by the last drum 16 into the chute 4. When the cotton is clean enough, as to not need to be passed through the saw device and the parts associated therewith, the doors 18 can be closed by the operating rods 19 so that the cotton will pass directly from the drum 6 upon the drums 16 so that the cotton will be cleaned of dirt and the like.

As shown in Fig. 1, a worm gear 20 is connected to a projecting part of a pintle of the roll 6, and a worm 21 carried by a shaft 22 meshes with the worm gear 20 and the shaft has an adjustable pinion 23 thereon, which can be adjusted to engage any one of a number of annular rows of teeth 24, on a disk 25, which is connected to a pinion of one of the feed rolls 5 so that the speed of rotation of the rollers 5 can be controlled.

Figure 2:
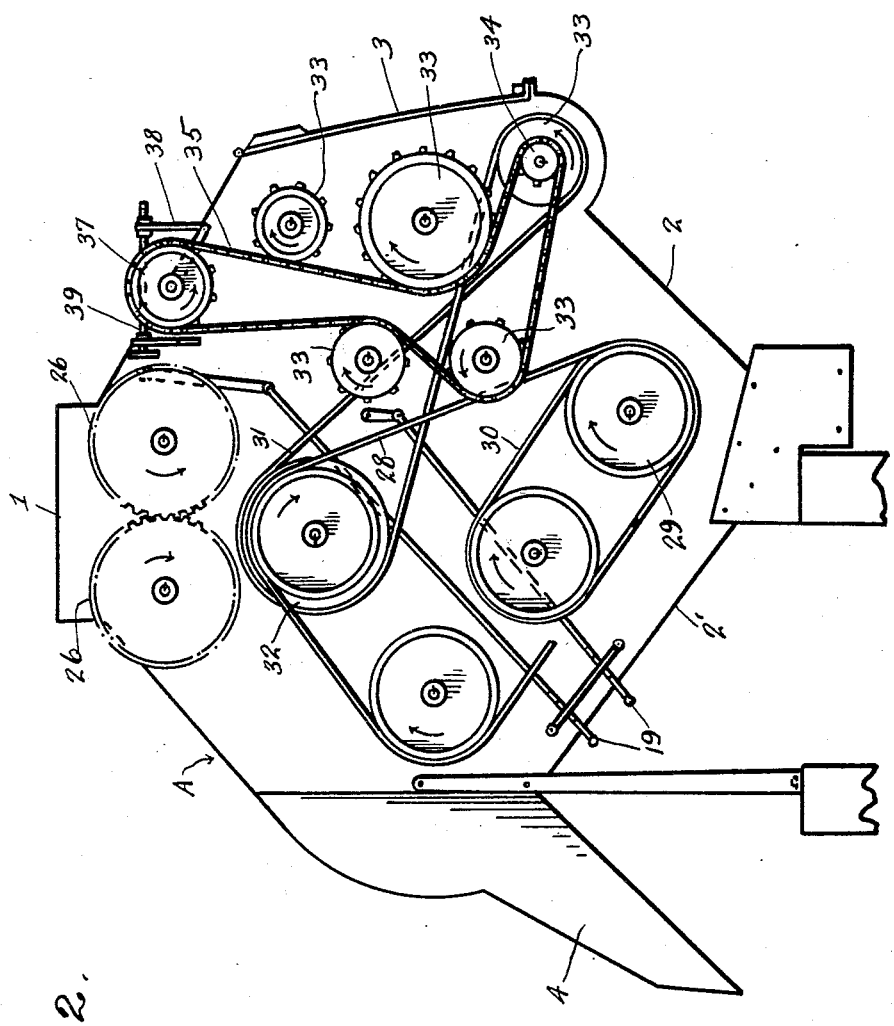
Fig. 2 is a view of the opposite side from that shown in Fig. 1.

On the oposite side of the casing, the feed rollers 5 are geared together by gears as shown at 26 in Fig. 2. A pulley 27 is connected to the pintle of the roller 6, at the same side of the machine on which the gears 26 are located, and a belt 28 passes over this pulley and over the pulleys 29 connected with the drums 16. A belt 30 also passes over the pulleys 29 of the first and second drums as clearly shown in Fig. 2. A cross belt 31 passes over a pulley 32 connected with the pulley 27 and said belt also passes over a pulley 33 connected with a pintle of the brush roller 15.

A sprocket 34 is connected with each of the brush roll, the saw shaft, the two spiral rollers and the stripper roller as shown in Fig. 2, and a chain 35 engages these sprockets and also engages a sprocket 37, the shaft of which is carried by a bell crank 38 which is adjusted to tighten the belt by the manually operated shaft 39.

From the foregoing it will be seen that I have provided means whereby the cotton is removed from the burrs and foreign matter as the rough cotton is moved against the saw device by the spiral rollers 8 and 12 and these parts are so arranged that the material is held against the saw device for a long time, so that practically all the cotton is removed from the burrs. Then the cotton is stripped from the saw by the brush roller, and passed through the cleaning drums.

As before stated, if the cotton is clear of burrs and the like, it can be fed directly into the cleaning drums from the main picker roller by closing the doors 18.

As is shown in Fig. 1, the bearings 40 of the saw device 9 and stripper roller 10 may be adjustable by means of the screws 41 carried by the brackets 42. This view also shows the conveyor shaft 43 being driven from the lower drum 16 through means of the chain and sprocket shown generally at 44. The bearings for the other pintles or shafts are shown at 45 in Fig. 1.

It is thought from the foregoing description that the advantages and novel features of the invention will be readily apparent.

It is to be understood that changes may be made in the construction and in the combination and arrangement of the several parts, provided that such changes fall within the scope of the appended claim.

Having thus described my invention, what I claim as new is:—

A cotton cleaning apparatus comprising a casing having an inlet at its top at substantially the middle thereof and a door covered opening at one side of the casing and a chute opening at the opposite side, a transverse partition in the casing spaced from the bottom and top portions thereof and in substantial alinement with that wall of the inlet opening closest to the door covered opening, a door section pivoted to the upper edge of the partition, a door section pivoted at its upper edge to the top part of the casing, said door section when in closed position closing the space above the partition, a pair of feeding rollers for receiving the cotton passing through the inlet, a main picker roller located under the feeding rollers for receiving the cotton from the feeding rollers, and located slightly to one side of said partition and rotated in a direction to throw the cotton received from the feeding rollers over the lower door section, upper and lower spiral picker rollers rotating in opposite directions and receiving the material from the main picker roller and located adjacent the door side of the partition, a trough for each of the spiral rollers and attached to the partition, an end of the casing having a discharge opening therein through which the material from the lower spiral roller passes, a saw roller located between the door and the spiral rollers and against which the spiral rollers move the cotton, a stripper roller located above the saw for throwing burrs and other foreign matter from the cotton on the saw back upon the upper spiral roller, a brush roller located below the saw, a diagonal row of cleaning drums in the casing, the lower one of which is located in the space below the partition, and the upper one of which delivers into the chute opening, the center one of which being located under the main picker roller, said casing having a sloping bottom part for receiving the cotton from the brush roller and leading it to the lower cleaning drum, and means for moving the door sections from a position where their adjacent edges contact to a position where the lower section is tilted towards the main picker roller and the upper section is moved to a tilted position towards the stripper roller.

In testimony whereof I affix my signature.

JOHN J. LESIKAR.